United States Patent [19]
Tanzer et al.

[11] Patent Number: 5,538,482
[45] Date of Patent: Jul. 23, 1996

[54] MULTIPLE-SPEED AXLE MECHANISM PROVIDING OVERDRIVE AND DIRECT DRIVE

[75] Inventors: John H. Tanzer, Troy; Ernie C. Besler, Washington; Rex R. Corless, Sterling Heights; Suresh C. Bansal, Plymouth, all of Mich.

[73] Assignee: Ford Motor Company, Dearborn, Mich.

[21] Appl. No.: 301,448

[22] Filed: Sep. 6, 1994

[51] Int. Cl.$^6$ .................................. F16H 3/54; F16H 3/56
[52] U.S. Cl. .......................... 475/316; 475/312; 475/328; 475/339
[58] Field of Search ...................... 475/312, 316, 475/328, 338, 339

[56] References Cited

U.S. PATENT DOCUMENTS 2,488,756  11/1949  Baker ........................................ 475/328
2,683,997  7/1954   Förster ...................................... 475/316
3,487,726  1/1970   Burnett ...................................... 475/316
4,567,788  2/1986   Miller ........................................ 475/328

*Primary Examiner*—Charles A. Marmor
*Assistant Examiner*—Sherry Estremsky
*Attorney, Agent, or Firm*—Frank G. McKenzie; Roger L. May

[57] ABSTRACT

In a powertrain, including a multiple-speed transmission, an axle shaft driven through differential mechanism, a two-speed axle mechanism includes an input shaft connected to the drive shaft, a multiple speed gear mechanism driveably connected to the differential mechanism. One form of the two-speed axle includes a planetary gearset, an overrunning brake, a brake band, and a friction clutch. Another form of the axle mechanism includes gears formed on the input shaft and output shaft, a planet gear wheel rotatably supported on a carrier, the gears of the wheel meshing with the gears on the shafts. A spring-applied clutch connects the output shaft to the carrier, and an hydraulically-actuated brake releases the clutch and holds the carrier against revolution on a casing.

8 Claims, 3 Drawing Sheets

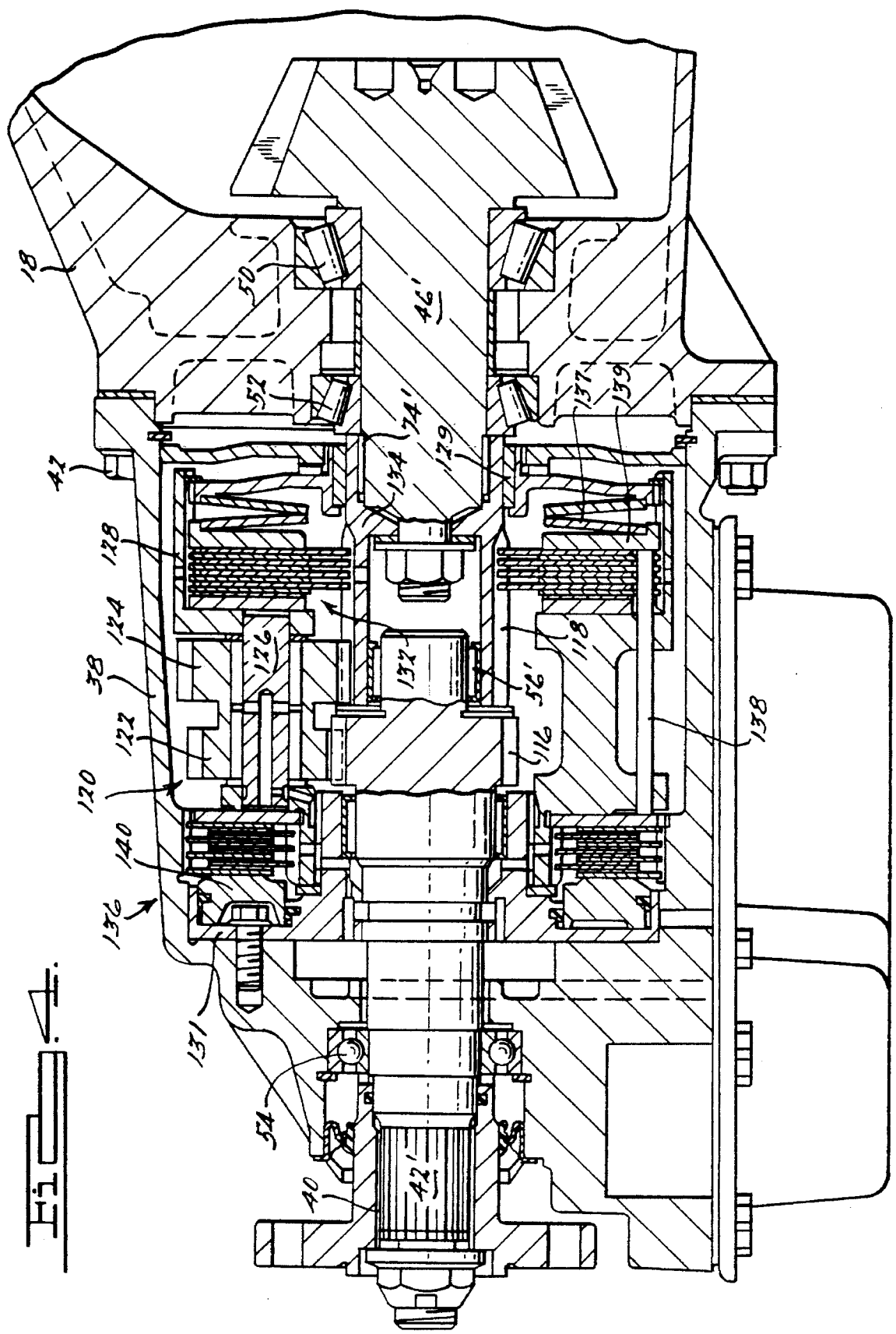

MULTIPLE-SPEED AXLE MECHANISM PROVIDING OVERDRIVE AND DIRECT DRIVE

BACKGROUND OF THE INVENTION

1. Field of the Invention

This invention relates to the field of power transmission in a driveline for an automotive vehicle. More particularly, it pertains to a multiple-speed final drive mechanism for use with a transmission mechanism.

2. Description of the Prior Art

To improve fuel economy and performance of a powertrain equipped with a multiple-speed transmission, attempts are being made to increase the number of forward speed ratios produced by the transmission. Adding gears broadens the span from first to top gear and reduces the size of steps between gears. Small step sizes help to maintain engine speed closer to its optimal value. The transmission delivers power smoother, and reduces the need to maintain desired engine speed by adjusting the throttle position.

Various attempts have been made to increase the number of speed ratios produced by an automatic transmission by adding an auxiliary gearset in the torque delivery path at a location either before the existing planetary gearset or between a multiple-speed planetary gearset and the final drive gearset. The auxiliary gearsets are located coaxially with the engine crankshaft, or coaxially with the output shaft. An example of the former arrangement is disclosed in U.S. application Ser. No. 08/172,964, filed Dec. 27, 1993, and assigned to the assignee of the present invention.

A principal objective of a multiple-speed axle arrangement, according to the present invention, is to reduce the overall size, weight, complexity, and cost required to produce a five speed automatic transmission.

SUMMARY OF THE INVENTION

To avoid difficulties associated with developing and manufacturing automatic transmissions having a large number of forward speed ratios, the performance and fuel economy advantages can be realized by combining a multiple-speed automatic transmission having fewer speed ratios with a multiple-speed axle assembly. This combination can realize the desired objectives at a lower investment cost and in shorter time.

To realize these objectives and advantages, a multiple-speed axle assembly for use in a powertrain having a multiple-speed transmission includes a gearset adapted to produce a direct drive connection between an input shaft and output shaft and to overdrive an output shaft in relation to the speed of the input shaft. A clutch includes first friction elements connected to a first member of the gearset, second friction elements connected to a second member of the gearset, and a spring urging the friction elements into mutual engagement. A brake holds one of the group consisting of the first and second members against rotation. A resilient device urges the spring away from contact with the friction elements, thereby disengaging the first member and second member.

In one embodiment of the axle assembly, the gearset includes an output gear connected to the output shaft, a carrier mounted for revolution about the axis of the input shaft and output shaft, a pinion driveably connected to the input shaft, and a gear wheel rotatably supported on the carrier having a first gear meshing with the pinion and a second pinion meshing with the output gear. The brake includes third friction elements fixed against rotation, fourth friction elements connected to the carrier, a cylinder, a piston supported for displacement in response to hydraulic pressure in the cylinder. Piston displacement in a first direction forces the third and fourth friction elements into mutual frictional engagement, thereby holding the carrier against revolution. Piston displacement in a second direction disengages the third and fourth friction elements, thereby permitting the carrier to revolve. The resilient device urging the spring away from contact with the friction elements includes a rod connecting the cylinder and spring for moving the spring away from the first and second friction elements, whereby the clutch is disengaged as the piston moves in the first direction, and allowing the spring to force the first and second friction elements into mutual engagement, whereby the clutch is engaged as the piston moves in the second direction, thereby disengaging the first member and second member.

In another embodiment of the invention, the gearset includes a carrier connected to the input shaft, a sun gear, a ring gear surrounding the sun gear and driveably connected to the output shaft, and planet pinions rotatably supported on the carrier in meshing engagement with the sun gear and ring gear. The clutch includes first friction elements connected to the sun gear, second friction elements connected to the carrier, the friction elements adapted for mutual frictional engagement, a spring urging the first and second friction elements into mutual engagement, thereby driveably connecting the sun gear and carrier. The brake holds the sun gear against rotation in a first drive direction and releases the sun gear in a drive direction opposite the first direction. The resilient device for urging the spring away from contact with the friction elements includes a cylinder and a piston, connected to the spring and the first and second friction elements, supported for displacement in response to hydraulic pressure in the cylinder and a force developed by the spring. Piston displacement due to the spring force in a first direction forces the first and second friction elements into mutual frictional engagement, thereby driveably connecting the sun gear and carrier. Piston displacement in a second direction due to pressure in the cylinder tends to disengage the first and second friction elements, thereby releasing the connection of the sun gear and carrier.

BRIEF DESCRIPTION OF THE DRAWINGS

FIG. 4 is a cross section taken at plane 2—2 of FIG. 1 showing a different kinematic arrangement from that of FIG. 2.

DESCRIPTION OF THE PREFERRED EMBODIMENT

Figure 1:
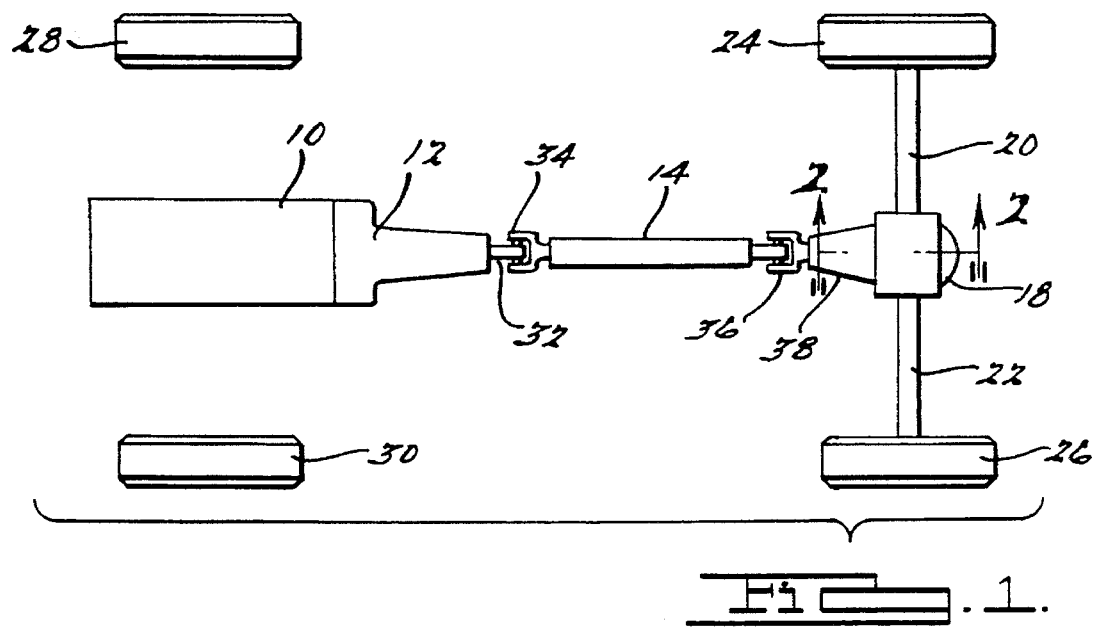
FIG. 1 is a schematic plan view of a powertrain for a motor vehicle that includes a multiple-speed rear axle assembly according to the present invention.

Referring now to FIG. 1, the powertrain for a rear wheel drive motor vehicle includes an engine 10; transmission 12; rear drive shaft 14; rear axle differential housing 18, left-hand and right-hand rear axle shafts 20, 22; and rear drive wheels 24, 26. The right-hand and left-hand front drive wheels 28, 30 are not driven. The engine crankshaft is driveably connected to the input shaft of a multiple-speed transmission whose output shaft 32 is connected through a universal joint 34 to the drive shaft 14, which is connected through another universal joint 36 to the input shaft of a multiple-speed axle drive mechanism located within a casing 38 connected to the rear axle differential housing 18.

Figure 2:
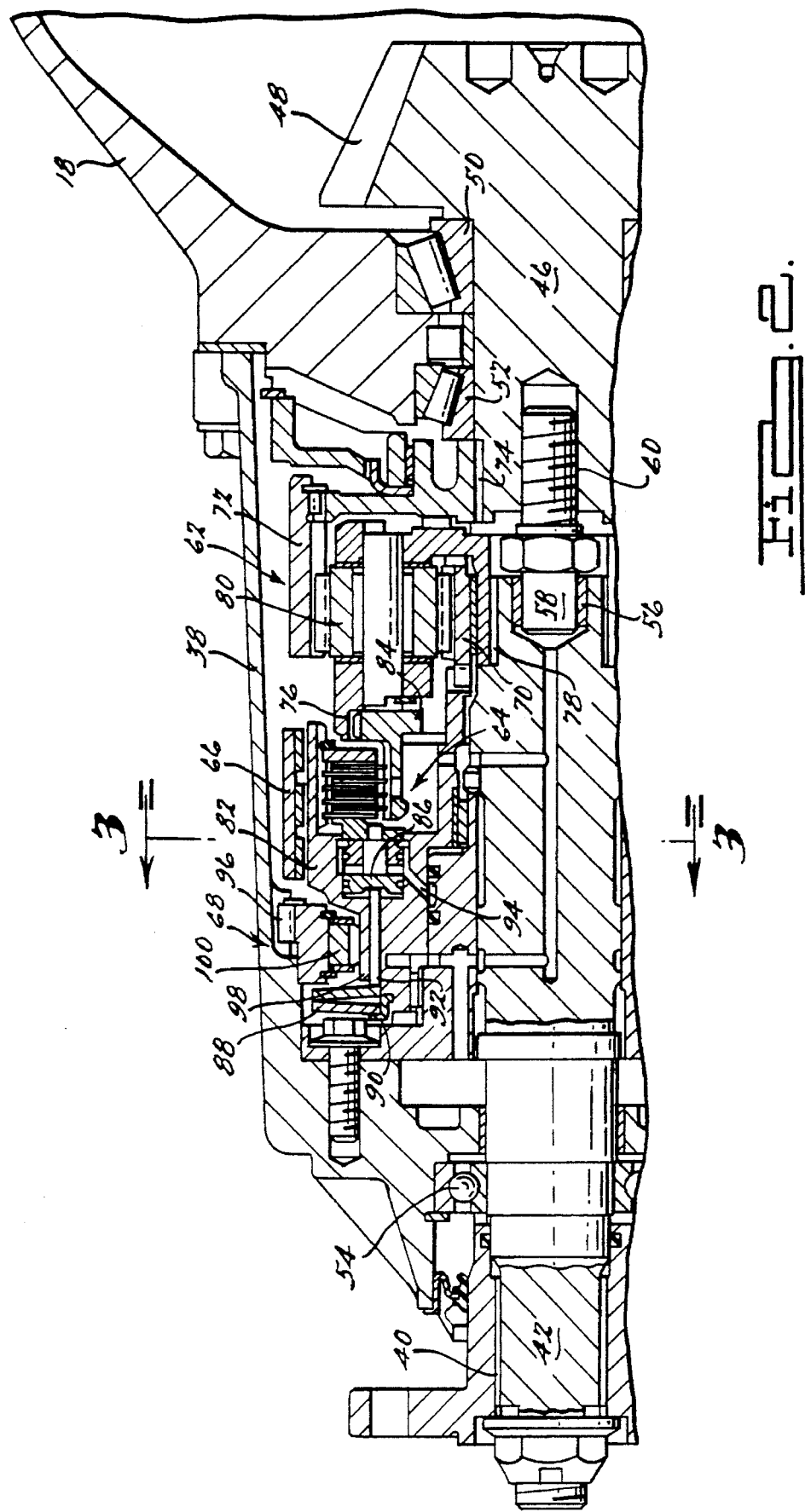
FIG. 2 is a cross section taken at plane 2—2 of FIG. 1 showing a kinematic arrangement having a planetary gearset according to the present invention.

Turning now to FIG. 2, drive shaft 14 is connected through spline 40 to the input shaft 42 of a two-speed axle, according to the present invention, located within casing 38, which is bolted to the differential housing 18.

The output shaft 46 of the two-speed axle carries a bevel gear 48, which drives the spindle of an interwheel differential located within housing 18. An example of an interwheel differential of this type is disclosed in U.S. Pat. No. 5,316,106. Shaft 46 is rotatably supported on roller thrust bearings 50, 52, and shaft 42 is supported partially on a ball bearing 54. The rearward end of shaft 42 is formed with a pocket recess, into which is located roller bearing 56, which rotatably supports a bolt 58 having screw threads that engage tapped threads 60 located at the adjacent end of shaft 46.

Located within casing 38 and surrounding shaft 42 are planetary gearset 62, friction clutch 64, brake band 66, and overrunning brake 68.

Gearset 62 includes a sun gear 70; ring gear 72 splined at 74 to the output shaft 46; carrier 76 splined at 78 to input shaft 42; and a set of planet pinions 80 rotatably supported on carrier 76 and in continuous meshing engagement with sun gear 70 and ring gear 72. The sun gear is mechanically connected to a first member 82 of clutch 64; carrier 76 is connected to a second member 84 of clutch 64. Member 82 includes a longitudinally directed spline surface engaged by separator plates of the clutch; member 84 includes a longitudinally directed spline surface engaged by friction plates of the clutch. Member 82 defines an hydraulic cylinder containing a piston 86, adapted to force the plates and discs of clutch 64 into mutual frictional engagement, thereby driveably connecting sun gear 70 and carrier 76 through members 82 and 84, respectively.

A compression spring 88, preferably a Belleville spring, held against axial displacement by a snap ring 90 fixed to member 82, forces rod 92 rightward into contact with piston 86. The cylinder in which piston 86 is located communicates through hydraulic passage 94 to a source of pressurized hydraulic fluid. When the cylinder is pressurized, pressure on piston 86 forces it leftward within the cylinder against the spring force, disengaging clutch 64 by removing frictional contact between the plates and discs of the clutch and permitting carrier 76 to rotate relative to sun gear 70.

Overrunning brake 68 includes an outer race 96 fixed to casing 38 against rotation and axial displacement, an inner race 98 in the form of a cylindrical surface formed on the radially outer surface of member 82, and a sprag or roller 100 located between the inner and outer races and adapted to produce a one-way drive connection between member 82 and casing 38.

Figure 3:
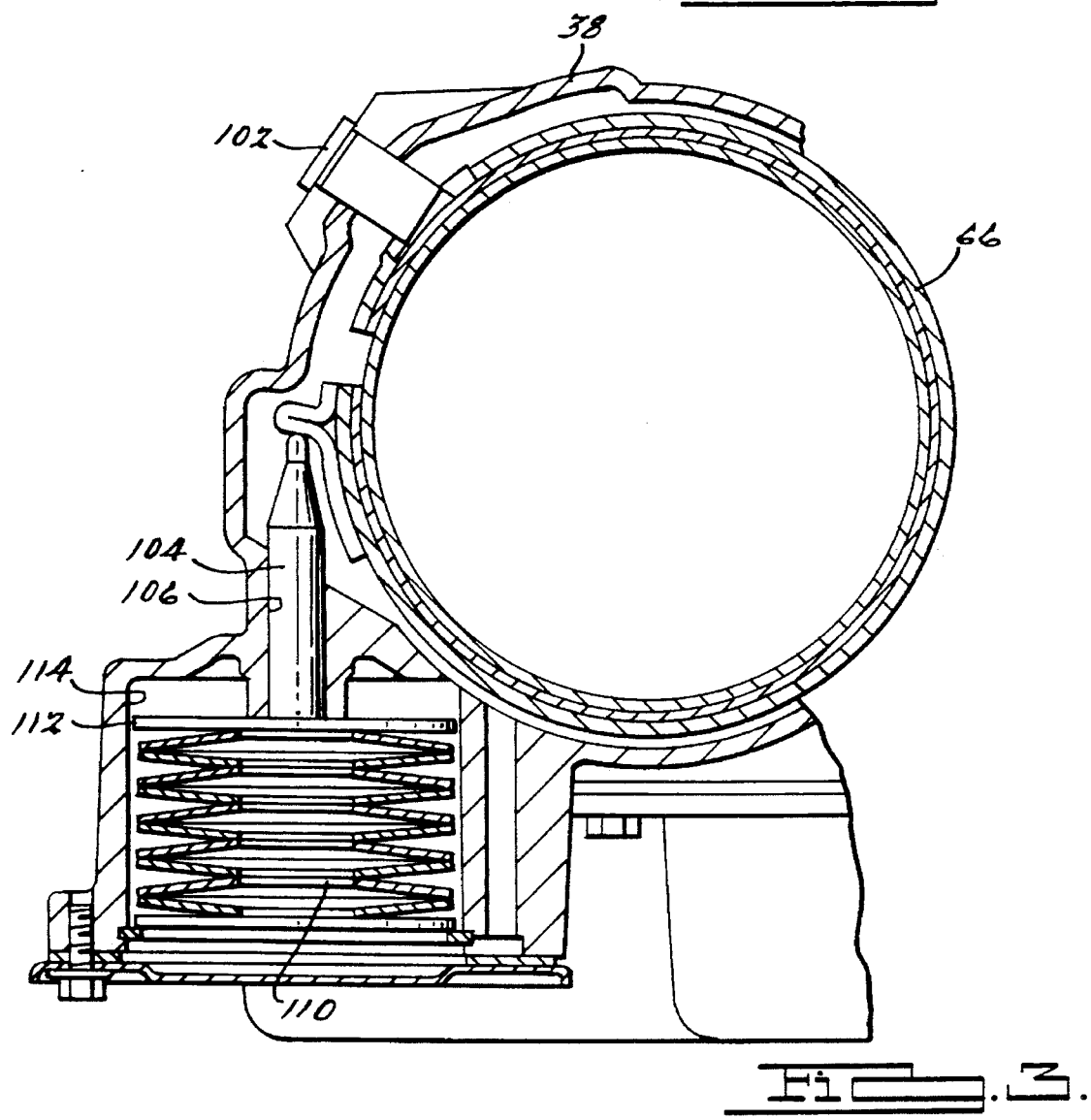
FIG. 3 is a cross section taken at plane 3—3 of FIG. 2.

Referring now to FIG. 3, one end of brake band 66 is fixed to casing 38 by a rivet 102. The opposite end of the brake band is connected to an actuator 104, connected to a piston 112, and guided for displacement along a cylindrical surface 106 formed in the casing. Multiple compression springs 110, fixed to actuator 104, force it upward so that the brake band contracts radially on the surface of member 82 and driveably connects sun gear 70 and casing 38. When cylinder 114 is pressurized, a pressure force developed on the upper face of piston 112 forces the piston and actuator downward, compressing the springs and disengaging brake band 66 from frictional engagement with member 82.

The two-speed axle of FIGS. 2 and 3 is particularly suited for use with an automatic transmission 12 that produces multiple forward speeds and reverse drive, selectable manually by the vehicle operator by moving a gear or range selector. When the transmission 12 produces any of the lower speed ratios in the automatic range, the two-speed axle of the present invention operates in a direct drive condition produced by venting hydraulic fluid through passage 94, thus engaging clutch 64. When clutch 64 is applied, it driveably connects sun gear 70 and carrier 76, which rotate at the speed of shaft 42 due to the spline connection at 78. Consequently, ring gear 72 rotates also at the speed of shaft 42 and drives output shaft 46 at that same speed through the spline connection at 74.

To produce an overdrive condition, the two-speed axle produces a speed increase from shaft 42 to shaft 46 by pressurizing passage 94 and the clutch cylinder, thereby disengaging clutch 64. In this condition, overrunning brake 68 driveably connects sun gear 70 to casing 38. Shaft 42 drives carrier 76, sun gear 70 is held fixed against rotation, providing a torque reaction, and ring gear 72 and output shaft 46 are driven through planet pinions 80 at a speed faster than the speed of shaft 42. With the two-speed axle mechanism so disposed but during drive conditions, when torque is transmitted from the engine to the drive wheels, in the M-1 or M-2 ranges, the mechanism operates as previously described with respect to the direct drive mode except that both brake 68 and band 66 are available to hold member 82 and sun gear 70 against rotation.

Engine braking is provided through the two-speed axle during coast conditions when torque is transmitted from shaft 46 to shaft 42, preferably when the vehicle operator moves the gear selector lever to the M-1 or M-2 ranges. By venting hydraulic pressure from brake cylinder 114, compression springs 110 engage brake band 66 so that sun gear 70 is held against rotation even though brake 68 overruns.

With the two-speed axle mechanism disposed for operation in the M-1 and M-2 ranges and during coast conditions, one-way brake 68 overruns and its function is replaced by the engagement of brake band 66, which holds sun gear 70 fixed against rotation on the transmission housing. Output shaft 46 drives ring gear 72, sun gear 70 is held against rotation and provides the torque reaction, and carrier 76 drives input shaft 42 through operation of the planetary pinions 80.

For operation in the reverse drive ratio, brake band 66 is engaged and clutch 64 is disengaged. With the two-speed axle mechanism so disposed, shaft 42 drives carrier 76, sun gear is held against rotation and provides the torque reaction, and ring gear 72 and output shaft 46 are driven through the planet pinions 80 in the reverse direction, the same direction as that of shaft 42.

Turning now to FIG. 4, an alternate form of the two-speed axle is shown located within casing 38. Input shaft 42' carries an input pinion 116, output shaft 46' is driveably connected to output gear 118, and a cluster gear wheel 120 includes integrally formed gears 122, 124, meshing, respectively, with pinion 116 and gear 118. Cluster gear wheel 120 is rotatably supported on a shaft 126, which is rotatably supported on bearings fitted on a carrier 128. The carrier 128 is supported for revolution about the axis of shafts 42', 46' on a needle bearing 129 and on a fitting 131.

A first friction clutch 132 includes a set of separator plates splined to carrier 128 and a set of friction discs splined to sleeve shaft 134, which is driveably connected through spline 74' to output shaft 46'. Clutch 132 includes a compression spring 136, preferably a Belleville spring, which applies a force continually, tending to engage frictionally the spacer plates and friction discs of clutch 132, thereby driveably connecting carrier 128 and output shaft 46'.

An hydraulically-actuated friction brake 136, located at the forward or left-hand end of casing 38, operates alternately to driveably connect carrier 128 and casing 38 by forcing a set of spacer plates, splined to the casing, and a set of friction discs, splined to member 130, into mutual frictional engagement. When brake 136 is applied, carrier 128 is held against rotation on the casing 38. Rods 138, preferably three or four rods spaced angularly about the axis of shafts 42', 46', extend through carrier 128 into contact with pressure plate 139 and compression spring 136. When brake 137 is applied, rods 130 move rightward and force compression spring 137 out of contact with the friction discs and spacer plates of clutch 132, thereby disengaging the clutch. When the cylinder, containing the piston 140 of brake 136, is vented, spring 136 expands, forces rods 138 leftward, and forces the spacer plates and friction discs of brake 136 into mutual friction engagement, thereby engaging brake 136.

The two-speed axle mechanism of FIG. 4 produces a direct drive connection between shafts 42' and 46' when clutch 132 is engaged and an overdrive connection between those shafts when brake 136 is applied and clutch 132 is released. During direct drive operation in the manual ranges, reverse drive, and lowest forward speed automatic ranges, clutch 132 is applied by venting pressure to the cylinder of brake 136. In the direct drive mode, clutch 132 driveably connects carrier 128 to output shaft 46' so that gear wheel 120 revolves at the same speed as that of shafts 42' and 46', thereby producing a direct drive connection between those shafts.

During operation in the overdrive condition, the space to the left-hand side of piston 140 is pressurized, thereby engaging brake 136 and disengaging clutch 132. This action holds carrier 128 fixed against rotation on the casing 138. With the two-speed axle so disposed, output shaft 46' is overdriven in relation to the speed of input shaft 42' due to the engagement of those shafts with gear wheel 120.

Having described the preferred embodiment of our invention, what we claim and desire to secure by U.S. Letters Patent is:

1. A multiple-speed axle assembly, comprising:

an input shaft;

an output shaft;

a gearset having first and second members, adapted to produce a direct drive connection between the input shaft and output shaft when said members are connected mutually and to overdrive the output shaft in relation to the input shaft when said members are mutually disconnected;

a clutch having first friction elements connected to the first member and second friction elements connected to the second member, said friction elements adapted for mutual frictional engagement, a spring urging the friction elements into mutual engagement;

brake means for holding one of the group consisting of the first and second members against rotation; and means for disengaging the friction elements thereby disengaging the first member and second member, including a cylinder, a piston located in the cylinder, and a rod connecting the cylinder and spring, for moving the spring away from the first and second friction elements, whereby the clutch is disengaged as the piston moves in a first direction, and for allowing the spring to force the first and second friction elements into mutual engagement, whereby the clutch is engaged as the piston moves in a second direction.

2. The assembly of claim 1, wherein the first member comprises an output gear connected to the output shaft; the second member comprises a carrier mounted for revolution about the axis of the input shaft and output shaft; and the gearset further comprises:

a pinion driveably connected to the input shaft; and a gear wheel rotatably supported on the carrier, having a first gear meshing with the pinion, a second pinion meshing with the output gear.

3. The assembly of claim 2, wherein the brake means comprises:

third friction elements fixed against rotation;

fourth friction elements connected to the carrier;

the piston supported for displacement in response to hydraulic pressure in the cylinder, piston displacement in a first direction forcing said third and fourth friction elements into mutual frictional engagement, thereby holding the carrier against revolution, piston displacement in a second direction disengaging said third and fourth friction elements, thereby permitting the carrier to revolve.

4. The assembly of claim 1, wherein the first member comprises a carrier connected to the input shaft, the second member comprises a sun gear; and the gearset further comprises:

a ring gear surrounding the sun gear and driveably connected to the output shaft; and planet pinions rotatably supported on the carrier, in meshing engagement with the sun gear and ring gear.

5. The assembly of claim 4, wherein the brake means comprises an overrunning brake adapted to hold the sun gear against rotation in a first drive direction and to release the sun gear in a drive direction opposite the first direction.

6. The assembly of claim 5, wherein the clutch means comprises:

first friction elements connected to the carrier;

second friction elements connected to the sun gear, said friction elements adapted for mutual frictional engagement;

a spring urging the first and second friction elements into mutual engagement.

7. The assembly of claim 6, wherein the urging means comprises:

a cylinder;

a piston connected to the spring and the first and second friction elements, supported for displacement in response to hydraulic pressure in the cylinder and a force developed by the spring, piston displacement due to the spring force in a first direction forcing said first and second friction elements into mutual frictional engagement, thereby driveably connecting the sun gear and carrier, piston displacement in a second direction due to pressure in the cylinder tending to disengage said first and second friction elements, thereby releasing the connection of the sun gear and carrier.

8. A multiple-speed axle assembly, comprising:

an input shaft;

an output shaft;

a gearset having an output gear connected to the output shaft, a carrier mounted for revolution about the axis of the input shaft and output shaft, a pinion driveably connected to the input shaft, and a gear wheel rotatably supported on the carrier, having a first gear meshing with the pinion and a second pinion meshing with the output gear;

a clutch having first friction elements connected to a first member and second friction elements connected to a second member, said friction elements adapted for mutual frictional engagement, a spring urging the friction elements into mutual engagement;

brake means comprising third friction elements fixed against rotation, fourth friction elements connected to the carrier, a cylinder, a piston supported for displacement in response to hydraulic pressure in the cylinder, piston displacement in a first direction forcing said third and fourth friction elements into mutual frictional engagement, thereby holding the carrier against revolution, piston displacement in a second direction disengaging said third and fourth friction elements, thereby permitting the carrier to revolve; and means for urging the spring away from contact with the first and second friction elements comprising a rod connecting the cylinder and spring, for moving the spring away from the first and second friction elements, whereby the clutch is disengaged as the piston moves in the first direction, and for allowing the spring to force the first and second friction elements into mutual engagement, whereby the clutch is engaged as the piston moves in the second direction, thereby disengaging the first member and second member.

* * * * *